(12) United States Patent
Li et al.

(10) Patent No.: US 11,835,813 B2
(45) Date of Patent: Dec. 5, 2023

(54) DISPLAY MODULE, DISPLAY METHOD THEREOF AND DISPLAY DEVICE

(71) Applicant: BOE Technology Group Co., Ltd., Beijing (CN)

(72) Inventors: Zhongxiao Li, Beijing (CN); Wenqing Zhao, Beijing (CN); Jing Yu, Beijing (CN); Kuanjun Peng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 156 days.

(21) Appl. No.: 17/517,278

(22) Filed: Nov. 2, 2021

(65) Prior Publication Data

US 2022/0163843 A1    May 26, 2022

(30) Foreign Application Priority Data

Nov. 24, 2020    (CN) .......................... 202011325899.6

(51) Int. Cl.
*G02F 1/1335*    (2006.01)

(52) U.S. Cl.
CPC .. *G02F 1/133526* (2013.01); *G02F 1/133512* (2013.01); *G02F 1/133514* (2013.01)

(58) Field of Classification Search
CPC ......... G02F 1/133514; G02F 1/136222; G02F 1/133512; G02F 1/133509; H01L 29/78633; H01L 51/5284; G02B 30/00; G02B 35/33; G02B 30/29; G02B 30/28; G02B 30/31; G02B 30/32; H04N 13/00; H04N 13/32; H04N 13/302; H04N 13/349
See application file for complete search history.

(56) References Cited

U.S. PATENT DOCUMENTS

| | | | |
|---|---|---|---|
| 2003/0052836 A1* | 3/2003 | Matsumoto | H04N 13/324 348/E13.043 |
| 2013/0038811 A1* | 2/2013 | Sugita | G02B 30/25 349/96 |
| 2014/0098308 A1* | 4/2014 | Wu | G02F 1/136286 445/24 |

* cited by examiner

*Primary Examiner* — Jonathan Y Jung
(74) *Attorney, Agent, or Firm* — IPro, PLLC

(57) ABSTRACT

Provided are a display module, a display device and a display method. The display module includes a display panel and a lens layer on a light-exiting side of the display panel, and the display panel includes an array substrate and a color film substrate. The array substrate includes a plurality of pixel islands arranged in an array, and each pixel island includes a plurality of sub-pixels arranged in a first direction. The color film substrate includes a plurality of black matrices and a plurality of color filter elements, the black matrices and the color filter elements are arranged alternately, and each pixel island corresponds to one color filter element. The lens layer includes a plurality of cylindrical lenses arranged consecutively in the first direction, each cylindrical lens corresponds to a pixel island, and the pixel island is arranged on a focal plane of the corresponding cylindrical lens.

15 Claims, 5 Drawing Sheets

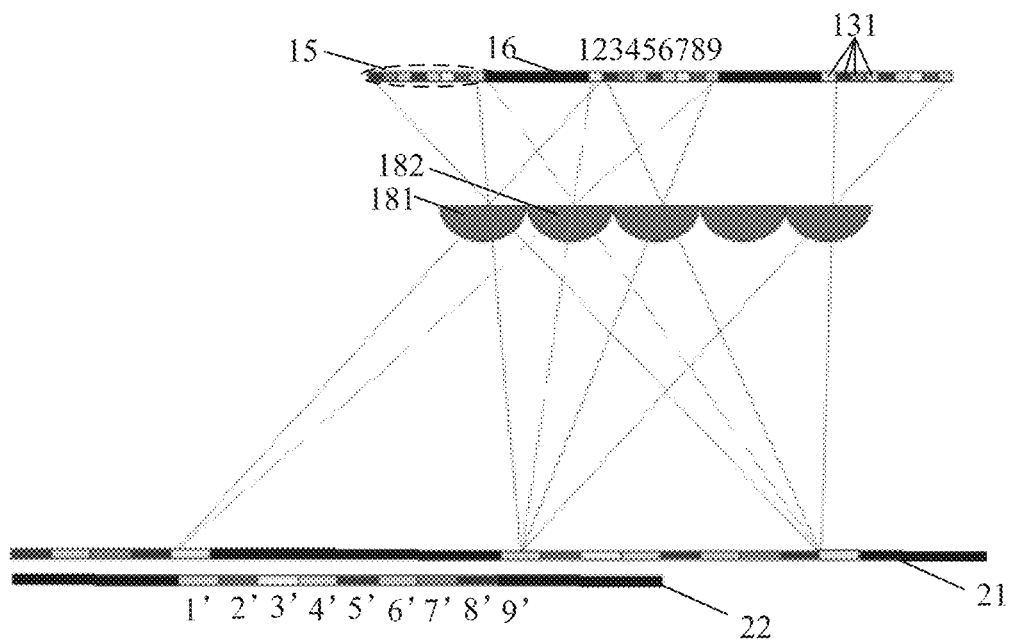

FIG. 9 emitting light, by each of the pixel islands of the array substrate, wherein the light is incident in a corresponding one of the color filter elements of the color film substrate, and exits from the light-exiting side of the display panel

↓ projecting the light emitted by each of the pixel islands to a human eye via the corresponding cylindrical lenses in the lens layer to form a continuous view area

FIG. 10

DISPLAY MODULE, DISPLAY METHOD THEREOF AND DISPLAY DEVICE

CROSS-REFERENCE TO RELATED APPLICATION

This application claims a priority to Chinese Patent Application No. 202011325899.6 filed in China on Nov. 24, 2020, the entire contents of which are hereby incorporated by reference.

TECHNICAL FIELD

The present disclosure relates to the field of display technologies, and in particular to a display module, a display device, and a display method of the display module.

BACKGROUND

A liquid crystal display has advantages of light and thin, wide viewing angle range and high resolution, which has been widely recognized by the market. As the process advances and the market demand increases, higher PPI (Pixels Per Inch) products enter the market. In three-dimensional (3D) displays, the resolution is reduced to at least half on equal terms due to the need to display different visual information to different human eyes, whereas a more comfortable 3D design requires different views to be more concentrated, so that human eyes can view different information at different positions during position movement, thereby providing human eyes with the perception of dynamic parallax.

SUMMARY

In a first aspect, some embodiments of the present disclosure provide a display module including a display panel and a lens layer on a light-exiting side of the display panel. The display panel includes an array substrate and a color film substrate, the array substrate is provided with a plurality of pixel islands arranged in an array, and each of the pixel islands includes a plurality of sub-pixels arranged in a first direction. The color film substrate includes a plurality of black matrices and a plurality of color filter elements, the black matrices and the color filter elements are arranged alternately, and each of the pixel islands corresponds to one of the color filter elements. The lens layer includes a plurality of cylindrical lenses arranged consecutively in the first direction, each of the cylindrical lens corresponds to a pixel island of the plurality of pixel islands, and the pixel island is arranged on a focal plane of a corresponding one of the cylindrical lenses.

In an optional embodiment, the display panel includes a base substrate, where the array substrate is located on the base substrate, the color film substrate is located on the array substrate, and the lens layer is located on the color film substrate; and the first direction is an extension direction of the base substrate.

In an optional embodiment, a width of each of the color filter elements in the first direction is n times of a width of one of the black matrices, every n+1 of the cylindrical lenses correspond to one of the pixel islands, the width of each of the pixel islands in the first direction is less than or equal to a preset width, and n is an integer greater than or equal to 1.

In an optional embodiment, the width of each of the color filter elements is equal to the width of the black matrix, and every two of the cylindrical lenses correspond to one of the pixel islands.

In an optional embodiment, the width of each of the color filter elements is equal to the width of the black matrix, and every two of the cylindrical lenses correspond to one of the pixel islands.

In an optional embodiment, each of the pixel islands includes eight sub-pixels, where a first sub-pixel and a fifth sub-pixel are configured to display same information, a second sub-pixel and a sixth sub-pixel are configured to display same information, a third sub-pixel and a seventh sub-pixel are configured to display same information, a fourth sub-pixel and an eighth sub-pixel are configured to display same information, and the eight sub-pixels are configured to form four view areas when the information displayed by the eight sub-pixels is projected to human eyes.

In an optional embodiment, every m+1 of the cylindrical lenses correspond to one of the pixel islands, and at least one of the sub-pixels in the pixel island and proximate to the black matrix is configured in a black state to form a display width of the corresponding color filter element in the first direction to be m times of a display width of the black matrix, m being an integer equal to or larger than 1.

In an optional embodiment, the display panel includes:
a base substrate;
a plurality of pixel electrodes on the base substrate, where each of the pixel electrodes is one of the sub-pixels;
a liquid crystal layer on the plurality of pixel electrodes; and
a common electrode on the liquid crystal layer,
where the color film substrate is on the common electrode, the lens layer is on the color film substrate, and an extension direction of each of the cylindrical lens of the lens layer is the same as an extension direction of each of the pixel electrodes.

In an optional embodiment, the first direction is an extending direction of the base substrate, the extension direction of the pixel electrode is perpendicular to the first direction and parallel to a plane where the substrate is located; and in the extending direction of each of the pixel electrodes, a length of each of the pixel electrodes is equal to a length of each of the black matrixes and a length of each of the color filter elements.

In an optional embodiment, in the extending direction of each of the pixel electrodes, the length of each of the pixel electrodes is equal to a length of each of the cylindrical lens of the lens layer.

In a second aspect, some embodiments of the present disclosure provide a display device including a display module as described in any one of the above embodiments.

In a third aspect, some embodiments of the present disclosure provide a display method of the display module as described in the above embodiments, including: emitting light, by each of the pixel islands of the array substrate, where the light is incident in a corresponding one of the color filter elements of the color film substrate, and exits from the light-exiting side of the display panel; and projecting the light emitted by each of the pixel islands to a human eye via the corresponding cylindrical lenses in the lens layer to form a continuous view area.

In an optional embodiment, a width of each of the color filter elements in the first direction is n times of a width of one of the black matrices, every n+1 of the cylindrical lenses correspond to one of the pixel islands, the width of each of the pixel islands in the first direction is less than or equal to a preset width, and n is an integer greater than or equal to 1, where the projecting the light emitted by each of the pixel islands to the human eye via the corresponding cylindrical lenses in the lens layer to form the continuous view area includes: projecting light emitted by sub-pixels of each pixel island to the human eye via the n+1 cylindrical lenses corresponding to the pixel island to form the continuous view area.

In an optional embodiment, every m+1 of the cylindrical lenses correspond to one of the pixel islands, the display method further includes: configuring at least one of the sub-pixels in the pixel island and proximate to the black matrix as a black state, and forming a display width of the corresponding color filter element in the first direction to be m times of a display width of the black matrix, m being an integer equal to or larger than 1; the projecting the light emitted by each of the pixel islands to the human eye via the corresponding cylindrical lenses in the lens layer to form the continuous view area includes: projecting light emitted by sub-pixels of each pixel island to the human eye via the m+1 cylindrical lenses corresponding to the pixel island to form the continuous view area.

BRIEF DESCRIPTION OF THE DRAWINGS

In order to explain technical solutions of embodiments of the present disclosure more clearly, the following description is given with reference to the accompanying drawings, which are required to be used in the description of the embodiments. It is obvious that the drawings in the following description are only some embodiments of the present disclosure, and according to these drawings, a person skilled in the art can obtain other drawings without involving inventive efforts.

FIG. 9 illustrates a schematic optical path diagram of a display module according to further embodiments of the present disclosure; and FIG. 10 illustrates a flow chart of a display method according to some embodiments of the present disclosure.

DETAILED DESCRIPTION

Figure 1:
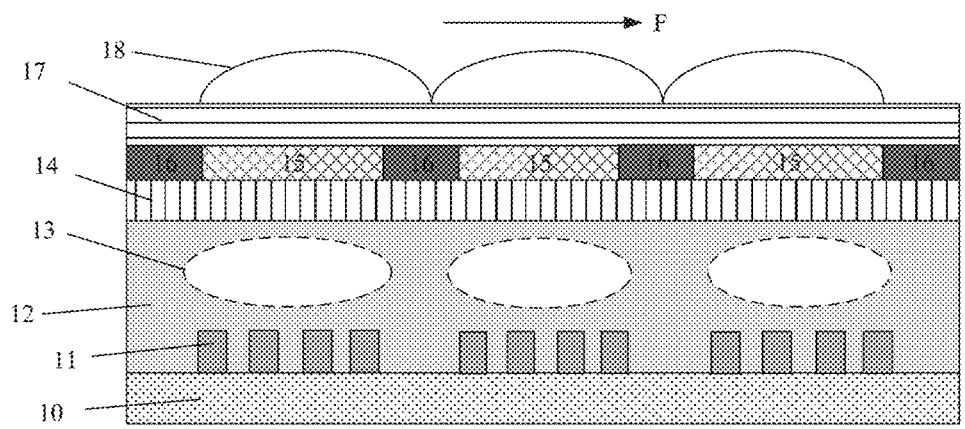
FIG. 1 illustrates a schematic structural diagram of a display module according to some embodiments of the present disclosure.

To more clearly illustrate the present disclosure, a further description of the present disclosure is provided below in connection with optional embodiments and accompanying drawings. Similar parts in the drawings are denoted by the same reference signs. It is to be understood by persons of ordinary skill in the art that the following detailed description is intended to be illustrative and not restrictive, which is not intended to limit the scope of the present disclosure.

It should be noted that such expressions as "on", "formed on", and "arranged on" may mean that a layer is formed or arranged directly on another layer, or that a layer is formed or arranged indirectly on another layer, i.e., there may be an additional layer between the two layers. In this specification, unless otherwise specified, the term "in the same layer" means that two layers, components, structures, elements or sections may be formed by a same patterning process, and that the two layers, components, structures, elements or sections are generally made of a same material. Herein, unless otherwise specified, the expression "patterning process" generally includes steps of coating, exposing, developing, etching of photoresist, stripping of photoresist, etc. The expression "one or a single patterning process" means a process of forming a patterned layer, component, member or the like by using a mask plate.

Since 3D displays need to provide a more dense arrangement of views than 2D displays, more resolution is compromised. In addition, the problems of crosstalk and moire patterns in 3D display adversely affect the viewing effect of 3D display. The crosstalk and black area problems affect the viewing effect of an unaided-eye 3D display device in the related art, and the fixed viewing position also restricts the freedom of the viewer, causing discomfort.

With regard to the problems in the related art, as shown in FIG. 1, some embodiments of the present disclosure provide a display module, including a display panel and a lens layer arranged on a light-exiting side of the display panel. The display panel includes an array substrate and a color film substrate. The array substrate is provided with a plurality of pixel islands arranged in an array, and each of the pixel islands includes a plurality of sub-pixels arranged in a first direction. The color film substrate includes black matrices and color filter elements defined by the black matrices, the black matrices and the color filter elements are arranged alternately, and each of the pixel islands corresponds to one of the color filter elements. The lens layer includes a plurality of cylindrical lenses arranged consecutively in the first direction, each of the cylindrical lens corresponds to a pixel island of the plurality of pixel islands, and the pixel island is arranged on a focal plane of a corresponding one of the cylindrical lenses.

In some embodiments, the display panel includes a base substrate, where the array substrate is located on the base substrate, the color film substrate is located on the array substrate, and the lens layer is located on the color film substrate; where the first direction is an extension direction of the base substrate.

In the embodiments, problems about crosstalk and black area in the conventional 3D technology can be solved by arranging the color filter elements and the cylindrical lenses corresponding to the pixel islands, thereby achieving continuous viewing between various visual areas.

In a specific example, as shown in FIG. 1, the display panel includes:

a base substrate 10;

a plurality of pixel electrodes 11 arranged on the base substrate 10, where the pixel electrodes 11 extend in a direction perpendicular to this paper surface, and each pixel electrode 11 is a sub-pixel;

a liquid crystal layer 12 arranged on the pixel electrodes 11, where the liquid crystal layer 12 includes a plurality of pixel islands 13 arranged in an array, and each pixel island 13 includes a plurality of sub-pixels arranged in a first direction F;

a common electrode 14 arranged on the liquid crystal layer 12;

a color film substrate arranged on the common electrode 14, where the color film substrate includes a plurality of black matrices 16 and a plurality of color filter elements 15 defined by the black matrices 16; in some embodiments, the color film substrate includes color filter elements of different colors defined by the black matrices 16, corresponding to at least three RGB sub-pixels included by each pixel, for example, a red filter element, a green filter element and a blue filter element, where one pixel island is formed by one sub-pixel, namely, one pixel island corresponds to one color filter element;

a cover plate 17 arranged on the color film substrate; and a lens layer arranged on the cover plate 17 and including a plurality of cylindrical lenses 18 successively arranged along a first direction F, where each cylindrical lens 18 corresponds to a pixel island. An orthographic projection of each cylindrical lens onto the base substrate covers an orthographic projection of the corresponding pixel island onto the base substrate, i.e., the aperture of each cylindrical lens is related to the size of the pixel island. Optionally, by taking into account that the light viewed by human eyes at various locations originates from a location of the pixel island, the pixel island is arranged in a focal plane of the corresponding cylindrical lens.

In some embodiments, the pixel electrode 11 is a stripe-shaped electrode, which may be arranged to extend perpendicularly to the first direction F or at an angle to the first direction F. In other embodiments, the pixel electrode 11 may have other shapes, such as a comb shape, which is not particularly limited in the present disclosure.

It may be appreciated that the black matrix 16 is arranged between any two color filter elements 15 of different colors to prevent cross-coloring.

Figure 2:
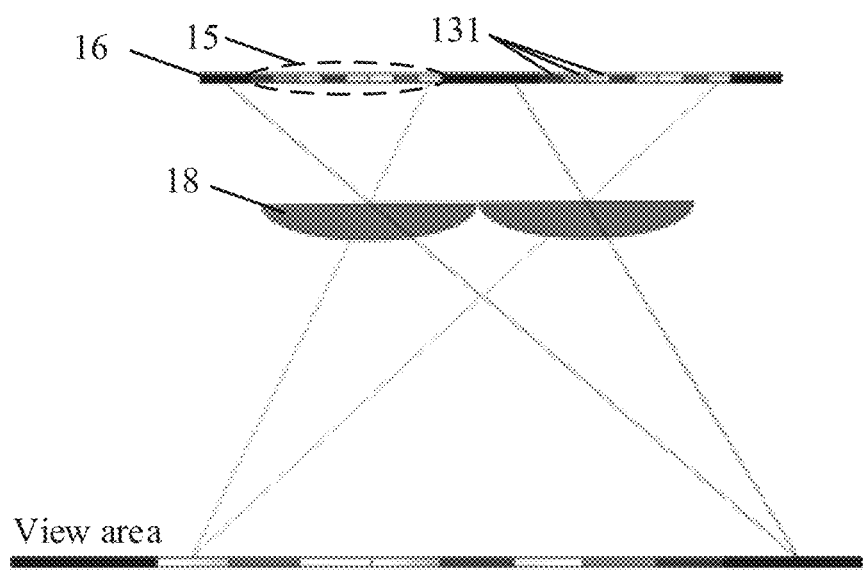
FIG. 2 illustrates an optical path diagram of a display module according to some embodiments of the present disclosure.

FIG. 2 shows a projection of light emitted by a display panel into human eyes via the corresponding cylindrical lenses in some embodiments. In the embodiments, the pixel island includes eight sub-pixels, and a black matrix is arranged between two adjacent pixel islands. As shown in FIG. 2, the light emitted by the sub-pixels of each pixel island propagates to the cylindrical lens, and is further projected into human eyes to form different view areas, and the view areas are continuous visually. Different sub-pixels may display different information, resulting in parallax, namely, the number of view areas in each pixel island is equal to the number of sub-pixels in the pixel island. Therefore, by arranging color filter elements and cylindrical lenses corresponding to pixel islands, a continuous view effect without a black area between different view areas in each pixel island can be achieved, thereby solving the problem of black areas existing between different view areas in the related art.

Figure 3:
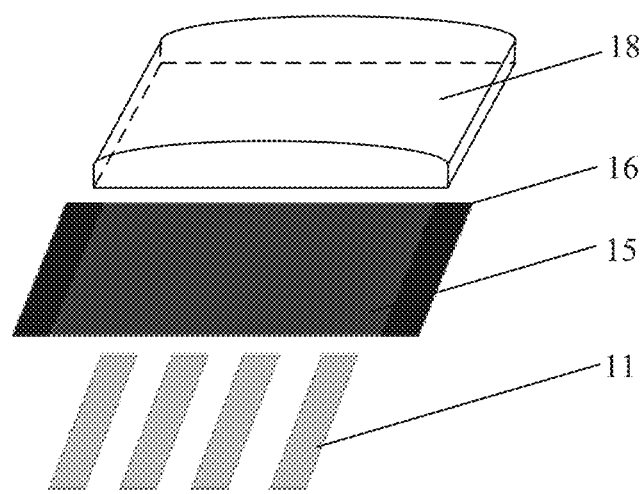
FIG. 3 illustrates a partial schematic diagram of a display module according to some embodiments of the present disclosure.

In an optional embodiment, as shown in FIG. 3, the cylindrical lens 18 of the lens layer extends in a same direction as the pixel electrode 11, and both the cylindrical lens 18 and the pixel electrode 11 extend in a direction perpendicular to the paper surface. Optionally, a length of the pixel electrode 11 is equivalent to, or equal to a length of the black matrix 16 and a length of the color filter element 15 in the direction perpendicular to the paper surface.

In some embodiments, as shown in FIG. 3, the length of the pixel electrode 11 is equal to the length of the cylindrical lens 18 in the direction perpendicular to the paper surface. In the embodiments, the extension direction F of the base substrate is a horizontal direction, the extension direction of the cylindrical lens 18 and the extension direction of the pixel electrode 11 are directions perpendicular to the paper surface, and the extension direction is perpendicular to the first direction F and parallel to a plane where the base substrate is located.

In the embodiments, on the basis of arranging the pixel islands on the focal plane of the cylindrical lenses, the extension direction of the cylindrical lens is the same as the extension direction of the pixel electrode, namely, the extension direction of the cylindrical lens is the same as the extension direction of the pixel island, which can minimize the crosstalk value of the display module, a theoretical value thereof being 0.

The above embodiments can achieve continuous viewing of various view areas within each pixel island. However, due to the presence of the black matrix, as shown in FIG. 2, there is a black area between two adjacent continuous view areas projected into human eyes, that is, a projection of the black matrix into human eyes.

With regard to the above-mentioned situation, inventors of the present application have further proposed some embodiments on the basis of the above-mentioned embodiments through a lot of theoretical studies and experiments. Specifically, a width of each of the color filter elements in the first direction is n times of a width of one of the black matrices, every n+1 of the cylindrical lenses correspond to one of the pixel islands, the width of each of the pixel islands in the first direction is less than or equal to a preset width, and n is an integer greater than or equal to 1.

In the embodiments, the width of the color filter element and the width of the black matrix are set in proportion, and at the same time, the number of cylindrical lenses corresponding to each pixel island is set correspondingly, so as to realize that a projection length of the light emitted from each color filter element projected into human eyes is proportional to a projection length of the corresponding black matrix projected into the human eyes. Meanwhile, the light rays are projected through different cylindrical lenses so that there is a projection of a view area and a projection of a black matrix viewing at any view location. Furthermore, by defining the size of each pixel island to be less than the preset width, i.e., defining the projection size of each pixel island to be less than the limit of the resolution capability of human eyes, the projection of the black matrix in human eyes can be ignored, thereby forming a continuous and uninterrupted view area display in human eyes and effectively improving the display effect of the display module.

Figure 4:
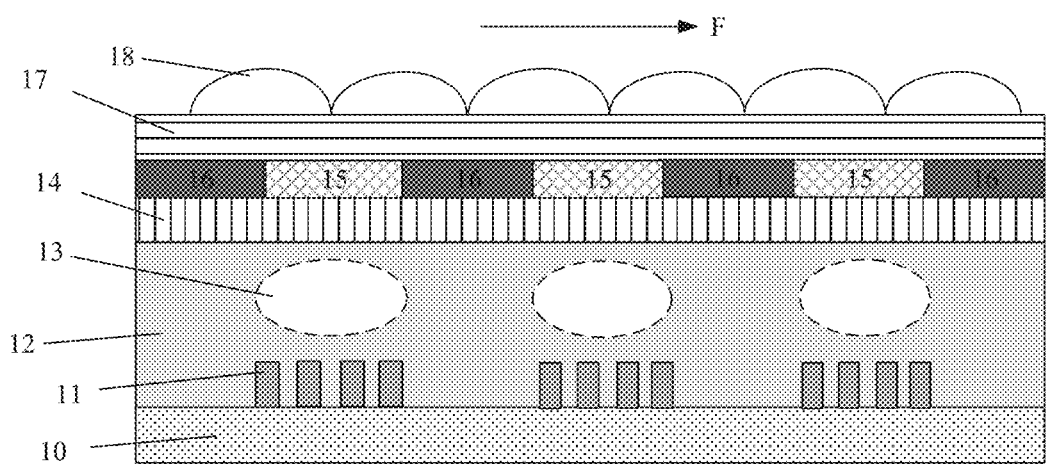
FIG. 4 illustrates a schematic structural diagram of a display module according to another embodiment of the present disclosure.

In a specific example, as shown in FIG. 4, the width of each of the color filter elements is equal to the width of the black matrix, and every two of the cylindrical lenses correspond to one of the pixel islands.

Figure 5:
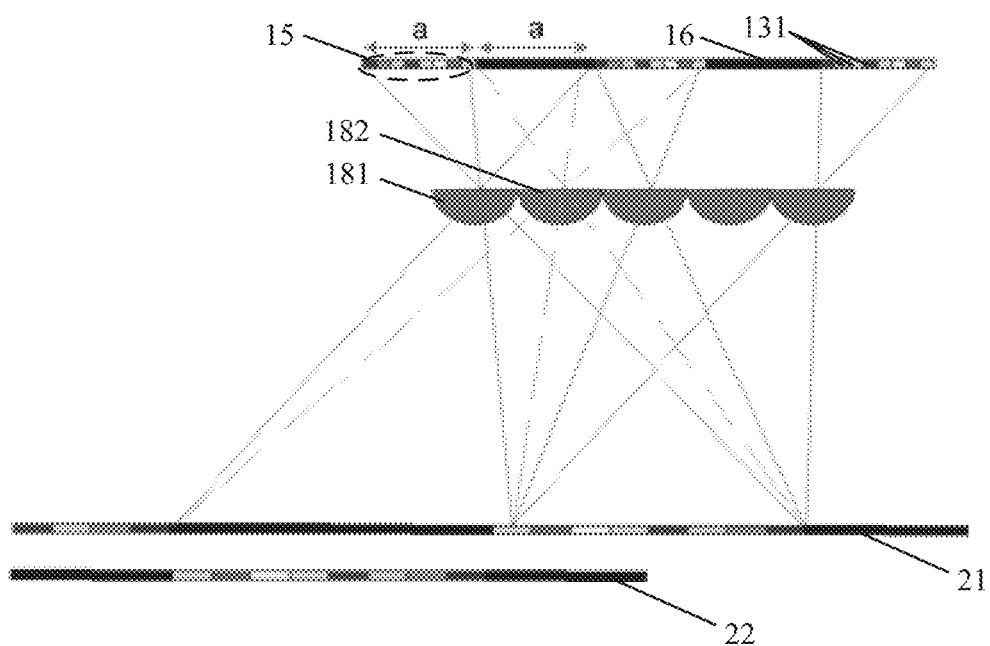
FIG. 5 illustrates an optical path diagram of a display module according to further embodiments of the present disclosure.
Figure 6:
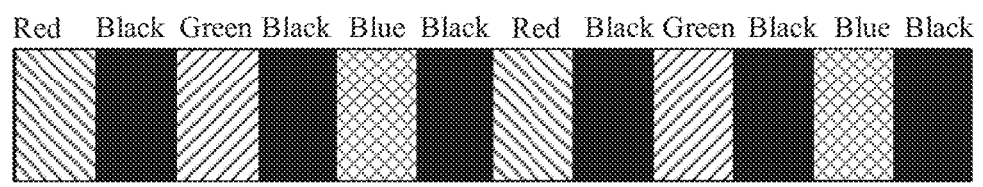
FIG. 6 illustrates a schematic projection diagram of a display module according to further embodiments of the present disclosure.

In an embodiment, as shown in FIG. 4 and FIG. 5, the width of the color filter element is set to be the same as the width of the black matrix, each of which is denoted by reference sign a; at the same time, the aperture of the cylindrical lens is reduced to half of the aperture of the cylindrical lens in the embodiment of FIG. 1, namely, each pixel island corresponds to two cylindrical lenses, and the light emitted from each color filter element is projected into human eyes through two corresponding cylindrical lenses. Specifically, as shown in FIG. 5, each pixel island corresponds to two cylindrical lenses 181 and 182, a solid line illustrates a projection result of the light emitted by the pixel island and passing through the left cylindrical lens 181, which forms a solid line projection view area 21 at human eyes, and a dotted line illustrates a projection result of the light emitted by the pixel island and passing through the right cylindrical lens 182, which forms a dotted line projection view area 22 at human eyes. It should be noted that the solid line projection view area 21 and the dotted line projection view area 22 coincide in space, which are separately identified for the convenience of description. As shown in FIG. 5, it can be seen that the light emitted from the same color filter element is projected by different cylindrical lenses to form different projection view areas, which includes the solid line projection view area 21 and the dotted line projection view area 22, a projection area of the black matrix in the solid line projection view area 21 corresponds to, or coincide with a projection area of the pixel island in the dotted line projection view area 22, and a projection area of the pixel island in the solid line projection view area 21 corresponds to, or coincide with a projection area of the black matrix in the dotted line projection view area 22. In other words, from the viewpoint of human eyes, when the size of the pixel island and the size of the corresponding cylindrical lens are sufficiently large, an image from a screen seen at an arbitrary view position is the image as shown in FIG. 6, and a projection of the light emitted from the color filter element into human eyes and a projection of the light emitted from the black matrix into human eyes are alternately arranged. Therefore, when it is defined that the projection size of the pixel island is less than the limit of the resolution capability of human eyes, human eyes cannot distinguish the projection corresponding to the black matrix between two projections corresponding to the color filter elements, namely, the projection corresponding to the black matrix in human eyes no longer affects the display effect, so as to realize the formation of continuous and uninterrupted view area display in human eyes, and solve the problems existing in the related art, thereby effectively improving the display effect of the display module.

Further, in an optional embodiment, as shown in FIG. 5, by taking the example of each pixel island including eight sub-pixels 131, the light rays emitted by the sub-pixels of each pixel island are transmitted the corresponding cylindrical lenses and are further projected into human eyes to form eight view areas, i.e., continuous uninterrupted view areas viewing in human eyes.

In an optional embodiment, a ratio of the width of the color filter element to the width of the black matrix is 2, and every three cylindrical lenses correspond to one pixel island.

Figure 7:
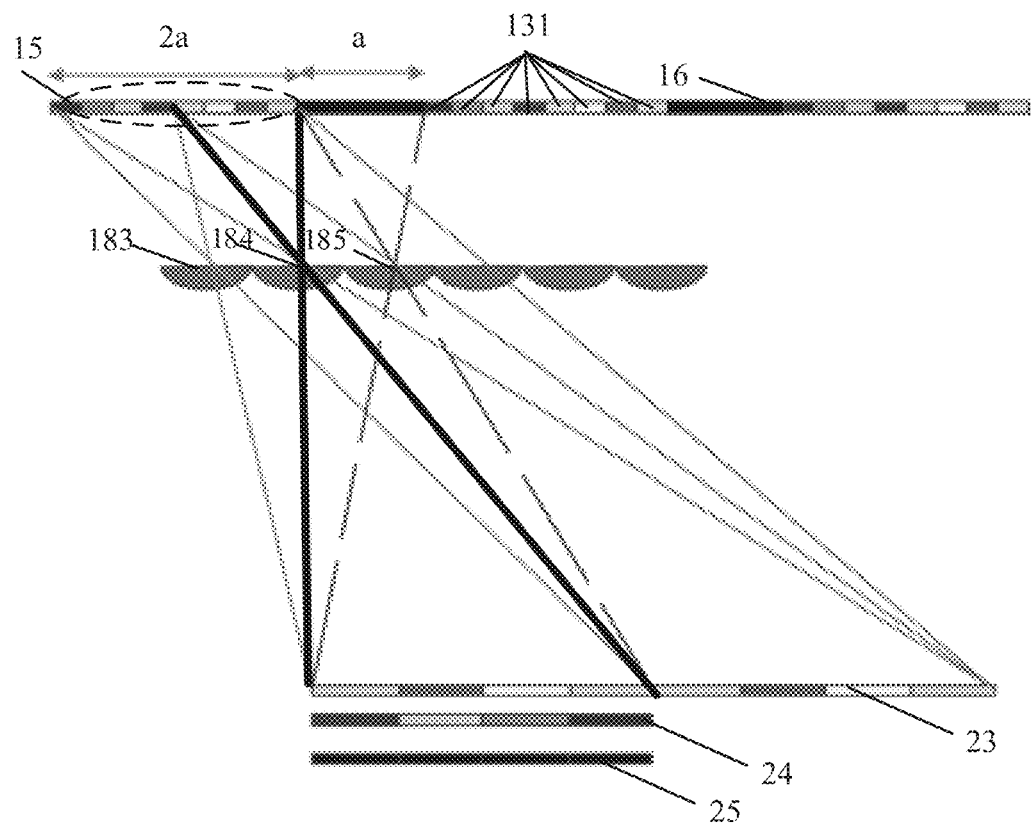
FIG. 7 illustrates a schematic optical path diagram of a display module according to further embodiments of the present disclosure.
Figure 8:
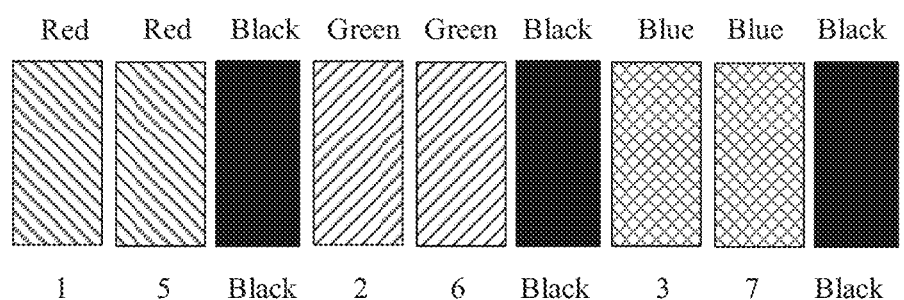
FIG. 8 illustrates a schematic projection diagram of a display module according to further embodiments of the present disclosure.

In this embodiment, as shown in FIG. 7, the width of the color filter element 15 is 2a, the width of the black matrix 16 is a, each pixel island corresponds to three cylindrical lenses, which are cylindrical lens 183 on the left side, cylindrical lens 184 in the middle and cylindrical lens 185 on the right side, and the light rays emitted from each color filter element are projected into human eyes through the corresponding two cylindrical lenses. Specifically, as shown in FIG. 7, the thin solid line illustrates a result of a projection of the light emitted by the pixel island and passing through the left cylindrical lens 183, which forms a projection view area 23 at human eyes, the thick solid line illustrates the result of the projection of the light emitted by the pixel island through the middle cylindrical lens 184, which forms a projection view area 24 at human eyes, and the dotted line illustrates the result of the projection of the light emitted by the pixel island through the right cylindrical lens 185, which forms a projection view area 25 at human eyes. It should be noted that the projection view area 23, the projection view area 24 and the projection view area 25 coincide with each other in space, which are separately identified for the convenience of description. Based on the projection view area 23, the projection view area 24 and the projection view area 25, an image as shown in FIG. 8 is viewed by human eyes at an arbitrary position, a projection of the light exiting from the color filter element and transmitting into human eyes and a projection of the light exiting from the black matrix and transmitting into human eyes are alternately arranged, and the projection length corresponding to each color filter element is twice of the projection length corresponding to the black matrix. When the projection size of the pixel island is defined to be less than the limit of the resolution capability of human eyes, human eyes cannot distinguish the projection corresponding to the black matrix between two projections corresponding to the color filter elements, namely, the projection corresponding to the black matrix in human eyes no longer affects the display effect, so as to realize the formation of continuous and uninterrupted view area display in human eyes, and solve the problems existing in the related art, thereby effectively improving the display effect of the display module.

Further, in an optional embodiment, by taking the example again that each pixel island includes eight sub-pixels 131, the light rays emitted by the sub-pixels of each pixel island are transmitted into human eyes through the cylindrical lens to form eight view areas, i.e., continuous and uninterrupted view areas viewing in human eyes. At the same time, considering that the projection of the light exiting from the color filter element and transmitting into human eyes and the projection of the light exiting from the black matrix and transmitting into human eyes are arranged at an interval of 2:1, a first sub-pixel and a fifth sub-pixel are configured to display same information, a second sub-pixel and a sixth sub-pixel are configured to display same information, a third sub-pixel and a seventh sub-pixel are configured to display same information, a fourth sub-pixel and an eighth sub-pixel are configured to display same information, and the eight sub-pixels are configured to form four view areas when the information displayed by the eight sub-pixels is projected to human eyes. In the present embodiment, according to the corresponding relationship between the sub-pixels and the color filter elements and the cylindrical lenses, sub-pixels of the same group may be arranged to connect with the same data line, namely, the first sub-pixel and the fifth sub-pixel of the same group use the same data line, the second sub-pixel and the sixth sub-pixel of the same group use the same data line, the third sub-pixel and the seventh sub-pixel of the same group use the same data line, and the fourth sub-pixel and the eighth sub-pixel of the same group use the same data line; thus the wiring of the display module is simplified, and the process complexity and the manufacturing cost are reduced.

It is worth noting that the present application does not define a ratio of widths of the color filter element and the black matrix on the color film substrate, and does not define a ratio of the quantity of the pixel islands to the quantity of the cylindrical lenses corresponding to the pixel islands, the above embodiments are merely used for describing the specific embodiments of the present application, and a person of ordinary skill in the art can choose the appropriate width ratio and quantity ratio according to practical application requirements, so as to satisfy the above corresponding ratio relationship, to achieve a continuous and uninterrupted view area display as a design criteria, which are not repeated herein in detail in the present embodiments.

Considering that the width of the color filter element and the width of the cylindrical lens may not be proportional, in an optional embodiment, every m+1 of the cylindrical lenses correspond to one of the pixel islands, and at least one of the sub-pixels in the pixel island and proximate to the black matrix is configured in a black state to form a display width of the corresponding color filter element in the first direction to be m times of a display width of the black matrix, m being an integer equal to or larger than 1.

In the embodiment, a display color of at least one sub-pixel in the pixel island is configured as black color, and the sub-pixel displaying the black color is used to compensate the black matrix, that is, adjusting a ratio of display widths of the color filter element and the black matrix to realize a continuous and uninterrupted view area display. It can be appreciated that the display widths are display widths obtained by projecting light emitted by the pixel island into human eyes through the color filter element and the black matrix.

Specifically, as shown in FIG. 9, an example is given that each pixel island corresponds to one color filter element and two cylindrical lenses, each pixel island corresponds to nine sub-pixels, and a width of one sub-pixel is 3 μm, so the total width of an open area of the pixel island is 27 μm, and a width of the black matrix is 21 μm. In order to realize the continuous and uninterrupted view area display viewing by human eyes at an arbitrary viewing position, the ratio of widths of the color filter element and the black matrix is satisfied by means of the compensation of the sub-pixel. Specifically, one pixel island corresponds to two cylindrical lenses 181 and 182, the ratio of widths of the color filter element 15 and the black matrix 16 is 1:1, and each pixel island includes nine sub-pixels, which are respectively represented by reference signs 1, 2, 3, 4, 5, 6, 7, 8 and 9. The sub-pixel 9 in the pixel island and proximate to the black matrix, is configured as a black state, that is, the sub-pixel 9 displays a black color, and the black matrix is compensated by setting the display color of the sub-pixel as the black color. As shown in FIG. 9, the sub-pixel 9 is configured to display a black color, and the view area 9 projected to human eyes is of the black color, so that a display width of the color filter element after being compensated may be considered as 24 μm, and a display width of the black matrix may be considered as 24 μm. Thus, the ratio of widths of the color filter element and the black matrix meets the above requirements of the width ratio, and a continuous and uninterrupted view area display can be formed in human eyes, thereby solving the problems existing in the related art, and effectively improving the display effect of the display module.

Corresponding to the display module provided in the above embodiments, some embodiments of the present application provide a display method of the above display module, and because the display method provided in the embodiments of the present application corresponds to the display module provided in the above embodiments, the preceding embodiments also apply to the display method provided in the present embodiments, which are not repeated in detail in the present embodiments.

As shown in FIG. 10, some embodiments of the present application provide a display method of the above-mentioned display module, including: emitting light, by each of the pixel islands of the array substrate, where the light is incident in a corresponding one of the color filter elements of the color film substrate, and exits from the light-exiting side of the display panel; and projecting the light emitted by each of the pixel islands to a human eye via the corresponding cylindrical lenses in the lens layer to form a continuous view area.

In the present embodiment, by arranging the cylindrical lens and the color filter elements corresponding to the pixel islands, the crosstalk and black area problems existing in the conventional 3D technology can be solved, thereby achieving a continuous viewing between various view areas. The present method embodiments are the same as the above embodiments about the display module, which will not be described in detail herein.

In an optional embodiment, a width of each of the color filter elements in the first direction is n times of a width of one of the black matrices, every n+1 of the cylindrical lenses correspond to one of the pixel islands, the width of each of the pixel islands in the first direction is less than or equal to a preset width, and n is an integer greater than or equal to 1. The projecting the light emitted by each of the pixel islands to the human eye via the corresponding cylindrical lenses in the lens layer to form the continuous view area includes: projecting light emitted by sub-pixels of each pixel island to the human eye via the n+1 cylindrical lenses corresponding to the pixel island to form the continuous view area.

In the embodiments, the width of the color filter element and the width of the black matrix are set in proportion, and at the same time, the number of cylindrical lenses corresponding to each pixel island is set correspondingly, so as to realize that a projection length of the light emitted from each color filter element projected into human eyes is proportional to a projection length of the corresponding black matrix projected into the human eyes. Meanwhile, the light rays are projected through different cylindrical lenses so that there is a projection of a view area and a projection of a black matrix viewing at any view location. Furthermore, by defining the size of each pixel island to be less than the preset width, i.e., defining the projection size of each pixel island to be less than the limit of the resolution capability of human eyes, the projection of the black matrix in human eyes can be ignored, thereby forming a continuous and uninterrupted view area display in human eyes and effectively improving the display effect of the display module.

In another optional embodiment, every m+1 of the cylindrical lenses correspond to one of the pixel islands, the display method further includes: configuring at least one of the sub-pixels in the pixel island and proximate to the black matrix as a black state, and forming a display width of the corresponding color filter element in the first direction to be m times of a display width of the black matrix, m being an integer equal to or larger than 1; the projecting the light emitted by each of the pixel islands to the human eye via the corresponding cylindrical lenses in the lens layer to form the continuous view area includes: projecting light emitted by sub-pixels of each pixel island to the human eye via the m+1 cylindrical lenses corresponding to the pixel island to form the continuous view area.

In the embodiments, a display color of at least one sub-pixel in the pixel island is configured as black color, and the sub-pixel displaying the black color is used to compensate the black matrix, that is, adjusting a ratio of display widths of the color filter element and the black matrix to realize a continuous and uninterrupted view area display. It can be appreciated that the display widths are display widths obtained by projecting light emitted by the pixel island into human eyes through the color filter element and the black matrix.

Based on the above display module, embodiments of the present disclosure provide a display device, including the above display module. The display device is a liquid crystal display device, and may be a product and a device with a display function, such as a mobile phone, a tablet computer, a television, a display, a notebook computer, a digital photo frame and a navigator.

In view of the existing problems, the present disclosure sets forth a display module, a display device and a display method of the display module, by arranged color filter elements and cylindrical lenses corresponding to pixel islands, the crosstalk and black area problem in the existing 3D technology can be solved, and the continuous view between various view areas can be achieved. Furthermore, by designing the width of the color filter element and the width of the black matrix to be in proportion, and correspondingly setting the number of cylindrical lenses corresponding to each pixel island, a continuous and uninterrupted view can be achieved, thereby addressing the problems existing in the related art, effectively improving the 3D display effect, improving the user experience, and having a wide application prospect.

It should be noted that the various embodiments described herein are described in a progressive manner, the same or similar parts throughout the various embodiments can be referred each other, and each embodiment focuses on the difference from the other embodiments. In particular, the method embodiments are described more simply because they are substantially similar to the product embodiments, and the relevant parts or contents can referred to the product embodiments.

Unless otherwise defined, technical terms or scientific terms used in the present disclosure shall have the usual meanings understood by those with ordinary skills in the field to which this disclosure belongs. Similar words such as "first" and "second" used in the present disclosure do not indicate any order, quantity or importance, but are only used to distinguish different components. Similar words such as "include" or "include" mean that an element or item appearing before the word covers an element or item listed after the word and their equivalents, but does not exclude other elements or items. Similar words such as "connected", "coupled" or "interconnected" are not limited to physical or mechanical connections, but may include electrical connections, whether direct or indirect. Similar words such as "on", "below", "left" and "right" are only used to indicate a relative position relationship, and when an absolute position of the described object changes, the relative position relationship may also change accordingly.

It is appreciated that when an element such as a layer, film, region, or substrate is referred to as being "on" or "below" another element, the element may be "directly" "on" or "below" the other element, or there may be an intermediate element between the two elements.

In the description of the foregoing embodiments, specific features, structures, materials, or characteristics may be combined in any one or more embodiments or examples in a suitable manner.

The above embodiments are just specific implementations of the present disclosure, but the protection scope of the present disclosure is not limited thereto. Any person skilled in the art can easily think of changes or substitutions within the technical scope disclosed in the present disclosure, which shall fall within the protection scope of the present disclosure. Therefore, the protection scope of the present disclosure should be subject to the protection scope of the appended claims.

What is claimed is:

1. A display module, comprising a display panel and a lens layer on a light-exiting side of the display panel, wherein the display panel comprises an array substrate and a color film substrate,
   the array substrate is provided with a plurality of pixel islands arranged in an array, and each of the pixel islands comprises a plurality of sub-pixels arranged in a first direction,
   the color film substrate comprises a plurality of black matrices and a plurality of color filter elements, the black matrices and the color filter elements are arranged alternately, and each of the pixel islands corresponds to one of the color filter elements; and
   wherein the lens layer comprises a plurality of cylindrical lenses arranged consecutively in the first direction, and the pixel island is arranged on a focal plane of a corresponding one of the cylindrical lenses;
   wherein a width of each of the color filter elements in the first direction is n times of a width of one of the black matrices, every n+1 of the cylindrical lenses correspond to one of the pixel islands, the width of each of the pixel islands in the first direction is less than or equal to a preset width, and n is an integer greater than or equal to 1.

2. The display module according to claim 1, wherein the display panel comprises a base substrate, wherein the array substrate is located on the base substrate, the color film substrate is located on the array substrate, and the lens layer is located on the color film substrate; and
   wherein the first direction is an extension direction of the base substrate.

3. The display module according to claim 1, wherein the width of each of the color filter elements is equal to the width of the black matrix, and every two of the cylindrical lenses correspond to one of the pixel islands.

4. The display module according to claim 3, wherein each of the pixel islands comprises eight sub-pixels, and the eight sub-pixels is configured to display different information, and to form eight view areas when the different information is projected to human eyes.

5. The display module according to claim 1, wherein the width of each of the color filter elements is twice of the width of the black matrix, and every three of the cylindrical lenses correspond to one of the pixel islands.

6. The display module according to claim 5, wherein each of the pixel islands comprises eight sub-pixels, wherein a first sub-pixel and a fifth sub-pixel are configured to display same information, a second sub-pixel and a sixth sub-pixel are configured to display same information, a third sub-pixel and a seventh sub-pixel are configured to display same information, a fourth sub-pixel and an eighth sub-pixel are configured to display same information, and the eight sub-pixels are configured to form four view areas when the information displayed by the eight sub-pixels is projected to human eyes.

7. The display module according to claim 1, wherein the display panel comprises:
   a base substrate;
   a plurality of pixel electrodes on the base substrate, wherein each of the pixel electrodes is one of the sub-pixels;
   a liquid crystal layer on the plurality of pixel electrodes; and
   a common electrode on the liquid crystal layer,
   wherein the color film substrate is on the common electrode, the lens layer is on the color film substrate, and an extension direction of each of the cylindrical lens of the lens layer is the same as an extension direction of each of the pixel electrodes.

8. The display module according to claim 7, wherein the first direction is an extending direction of the base substrate,
the extension direction of the pixel electrode is perpendicular to the first direction and parallel to a plane where the substrate is located; and
in the extending direction of each of the pixel electrodes, a length of each of the pixel electrodes is equal to a length of each of the black matrixes and a length of each of the color filter elements.

9. The display module according to claim 8, wherein in the extending direction of each of the pixel electrodes, the length of each of the pixel electrodes is equal to a length of each of the cylindrical lens of the lens layer.

10. A display device comprising the display module according to claim 1.

11. A display method of the display module according to claim 1, comprising:
emitting light, by each of the pixel islands of the array substrate, wherein the light is incident in a corresponding one of the color filter elements of the color film substrate, and exits from the light-exiting side of the display panel; and
projecting the light emitted by each of the pixel islands to a human eye via the corresponding cylindrical lenses in the lens layer to form a continuous view area.

12. The display method according to claim 11,
wherein the projecting the light emitted by each of the pixel islands to the human eye via the corresponding cylindrical lenses in the lens layer to form the continuous view area comprises: projecting light emitted by sub-pixels of each pixel island to the human eye via the n+1 cylindrical lenses corresponding to the pixel island to form the continuous view area.

13. A display module, comprising a display panel and a lens layer on a light-exiting side of the display panel, wherein the display panel comprises an array substrate and a color film substrate,
the array substrate is provided with a plurality of pixel islands arranged in an array, and each of the pixel islands comprises a plurality of sub-pixels arranged in a first direction,
the color film substrate comprises a plurality of black matrices and a plurality of color filter elements, the black matrices and the color filter elements are arranged alternately, and each of the pixel islands corresponds to one of the color filter elements; and
wherein the lens layer comprises a plurality of cylindrical lenses arranged consecutively in the first direction, and the pixel island is arranged on a focal plane of a corresponding one of the cylindrical lenses;
wherein every m+1 of the cylindrical lenses correspond to one of the pixel islands, and at least one of the sub-pixels in the pixel island and proximate to the black matrix is configured in a black state to form a display width of the corresponding color filter element in the first direction to be m times of a display width of the black matrix, m being an integer equal to or larger than 1.

14. A display method of the display module according to claim 13, comprising:
emitting light, by each of the pixel islands of the array substrate, wherein the light is incident in a corresponding one of the color filter elements of the color film substrate, and exits from the light-exiting side of the display panel; and
projecting the light emitted by each of the pixel islands to a human eye via the corresponding cylindrical lenses in the lens layer to form a continuous view area.

15. The display method according to claim 14, wherein the projecting the light emitted by each of the pixel islands to the human eye via the corresponding cylindrical lenses in the lens layer to form the continuous view area comprises: projecting light emitted by sub-pixels of each pixel island to the human eye via the m+1 cylindrical lenses corresponding to the pixel island to form the continuous view area.

* * * * *